(12) United States Patent
Rekow et al.

(10) Patent No.: US 9,776,906 B2
(45) Date of Patent: Oct. 3, 2017

(54) LASER MACHINING STRENGTHENED GLASS

(71) Applicant: Electro Scientific Industries, Inc., Portland, OR (US)

(72) Inventors: Mathew Rekow, Sunnyvale, CA (US); Yun Zhou, Sunnyvale, CA (US); Nicolas Falletto, Pessac (FR)

(73) Assignee: Electro Scientific Industries, Inc., Portland, OR (US)

( * ) Notice: Subject to any disclaimer, the term of this patent is extended or adjusted under 35 U.S.C. 154(b) by 550 days.

(21) Appl. No.: 14/229,347

(22) Filed: Mar. 28, 2014

(65) Prior Publication Data

US 2015/0274574 A1 Oct. 1, 2015

(51) Int. Cl.
| | |
|---|---|
| *C03B 33/09* | (2006.01) |
| *B23K 26/38* | (2014.01) |
| *C03B 33/10* | (2006.01) |
| *C03B 33/02* | (2006.01) |

(52) U.S. Cl.
CPC ........ *C03B 33/091* (2013.01); *C03B 33/0222* (2013.01); *C03B 33/102* (2013.01)

(58) Field of Classification Search
CPC ...... B23K 26/38; B23K 26/067; B23K 26/40; B23K 26/073; C03B 33/091; C03B 33/0222; C03B 33/102
See application file for complete search history.

(56) References Cited

U.S. PATENT DOCUMENTS

| | | |
|---|---|---|
| 4,702,042 A | 10/1987 | Herrington et al. |
| 4,828,900 A | 5/1989 | Mouly |
| 5,413,664 A | 5/1995 | Yagi et al. |
| 5,826,772 A | 10/1998 | Ariglio et al. |
| 5,973,290 A | 10/1999 | Noddin |
| 6,634,186 B2 | 10/2003 | Abe |

(Continued)

FOREIGN PATENT DOCUMENTS

| | | |
|---|---|---|
| CN | 1657220 A | 8/2005 |
| DE | 10029110 B4 | 5/2006 |

(Continued)

OTHER PUBLICATIONS

Bradley Elkins Riley, "Evporative Etching for Non-Contact Glass Scribing Using a Single-Mode Ytterbium Fiber Laser", North Carolina State University, 2007, 96 pages.

(Continued)

*Primary Examiner* — Brian Jennison

(57) ABSTRACT

An internal feature can be laser machined in strengthened glass sheets or panels by first laser machining a first scribe in a first surface proximate to the internal feature to be laser machined. The internal feature can be then laser machined by positioning a beam waist of a laser beam proximate to an opposite second surface by focusing the laser beam through the strengthened glass panel from the first surface. The internal feature is laser machined by repositioning the beam waist from the second surface to the first surface while removing material from a kerf surrounding the internal feature. When the laser beam waist is finally positioned proximate to the first surface material, the internal shape formed by the laser machining is easily and cleanly removed from the surrounding glass.

18 Claims, 5 Drawing Sheets

(56) References Cited

U.S. PATENT DOCUMENTS

| | | |
|---|---|---|
| 6,642,477 B1 | 11/2003 | Patel et al. |
| 6,809,291 B1 | 10/2004 | Neil et al. |
| 6,820,330 B1 | 11/2004 | Haba |
| 6,962,279 B1 | 11/2005 | Marek et al. |
| 6,992,026 B2 | 1/2006 | Fukuyo et al. |
| 7,378,342 B2 | 5/2008 | Kirby et al. |
| 8,075,999 B2 | 12/2011 | Barefoot et al. |
| 8,383,983 B2 | 2/2013 | Lee et al. |
| 8,584,354 B2 | 11/2013 | Cornejo et al. |
| 8,635,887 B2 | 1/2014 | Black et al. |
| 2001/0035447 A1 | 11/2001 | Gartner et al. |
| 2002/0041946 A1 | 4/2002 | Abe |
| 2005/0042805 A1 | 2/2005 | Swenson et al. |
| 2005/0221044 A1 | 10/2005 | Gaume et al. |
| 2006/0021978 A1 | 2/2006 | Alexeev et al. |
| 2007/0262464 A1 | 11/2007 | Watkins et al. |
| 2007/0291496 A1 | 12/2007 | Nashner et al. |
| 2008/0128953 A1 | 6/2008 | Nagai et al. |
| 2008/0185367 A1 | 8/2008 | El-Hanany et al. |
| 2008/0283509 A1 | 11/2008 | Abramov et al. |
| 2009/0201444 A1 | 8/2009 | Yamabuchi et al. |
| 2010/0147813 A1 | 6/2010 | Lei et al. |
| 2010/0206008 A1 | 8/2010 | Harvey et al. |
| 2010/0221583 A1 | 9/2010 | Foad et al. |
| 2010/0291353 A1 | 11/2010 | Dejneka et al. |
| 2011/0003619 A1 | 1/2011 | Fujii |
| 2011/0049765 A1* | 3/2011 | Li .................. C03B 33/093 264/400 |
| 2011/0124147 A1* | 5/2011 | Mayerhofer ........ H01L 31/1804 438/68 |
| 2011/0127242 A1 | 6/2011 | Li |
| 2011/0127244 A1 | 6/2011 | Li |
| 2011/0226832 A1 | 9/2011 | Bayne et al. |
| 2011/0318996 A1 | 12/2011 | Okafuji et al. |
| 2012/0052252 A1 | 3/2012 | Kohli et al. |
| 2012/0135177 A1 | 5/2012 | Cornejo et al. |
| 2012/0135195 A1 | 5/2012 | Glaesemann et al. |
| 2012/0145331 A1 | 6/2012 | Gomez et al. |
| 2012/0168412 A1 | 7/2012 | Hooper |
| 2012/0196071 A1 | 8/2012 | Cornejo et al. |
| 2012/0211923 A1 | 8/2012 | Garner et al. |
| 2013/0155004 A1 | 6/2013 | Yoshikawa |
| 2013/0192305 A1 | 8/2013 | Black et al. |
| 2013/0221053 A1 | 8/2013 | Zhang |
| 2013/0224439 A1 | 8/2013 | Zhang et al. |
| 2014/0093693 A1 | 4/2014 | Zhang et al. |
| 2014/0366456 A1* | 12/2014 | Chapman ................ E21B 10/46 51/307 |

FOREIGN PATENT DOCUMENTS

| | | | |
|---|---|---|---|
| DE | 102007009786 A1 | 8/2008 | |
| EP | 0321838 B1 | 2/1993 | |
| EP | 2096375 A1 | 2/2009 | |
| EP | 2371778 A1 | 5/2011 | |
| JP | 11-163403 A | 6/1996 | |
| JP | 2002-192369 A | 7/2002 | |
| JP | 2002-308637 A | 10/2002 | |
| JP | 2004-299969 A | 10/2004 | |
| JP | 2007-283318 A | 11/2007 | |
| JP | 2007-319881 A | 12/2007 | |
| JP | 2009-61462 A | 3/2009 | |
| JP | 2009-280452 A | 12/2009 | |
| JP | 2011-88179 A | 5/2011 | |
| JP | 2011-164508 A | 8/2011 | |
| JP | 2011-230940 A | 11/2011 | |
| JP | 2011-251879 A | 12/2011 | |
| KR | 10-2010-0031462 A | 3/2010 | |
| KR | 10-2012-0015366 A | 2/2012 | |
| WO | WO 2009/106582 A2 | 9/2009 | |
| WO | WO 2010/096359 A1 | 8/2010 | |
| WO | WO 2011/025903 A1 | 3/2011 | |
| WO | WO 2011/025908 A1 | 3/2011 | |

OTHER PUBLICATIONS

J. Zhang et al., "High-Speed Machining of Glass Materials by Laser-Induced Plasma-Assisted Ablation Using a 532-nm Laser", Appl. Phys. A 67, 499-501, 1998.

Kunihito Nagayama et al. (2011), "Pulse Laser Ablation by Reflection of Laser Pulse at Interface of Transparent Materials", Lasers—Applications in Science and Industry, Dr Krzysztof Jakubczak (Ed.), ISBN: 978-953-307-755-0, InTech, Available from: http://www.intechopen.com/books/lasers-applications-in-science-and-industry/pulse-laser-ablation-byreflection-of-laser-pulse-at-interface-of-transparent-materials.

Y. Hanada et al., "Laser-Induced Plasma-assisted Ablation (LIPAA): Fundamental and Industrial Applications", High Power Laser Ablation VI, Proc. of SPIE vol. 6261, 626111-1 to -15 (2006).

Loeschner, U., et al. "Micromachining of glass with short ns-pulses and highly repetitive fs-laser pulses." Proceedings of the ICALEO. 2008. 9 pages.

Beat Neuenschwander et al., "Processing of Metals and Dielectric Materials with PS-Laserpulses: Results, Strategies, Limitations and Needs" Proc. SPIE 7584, Laser Applications in Microelectronic and Optoelectronic Manufacturing XV, 75840R (Feb. 17, 2010); 14 pages.

M B Strigin, A N Chudinov, "Laser Processing of Glass by Picosecond Pulses", Quantum Electronics 24 (8) 732-735 (1994).

Anatoli A. Abramov et al., "Laser Separation of Chemically Strengthened Glass" Physics Procedia 5 (2010), 285-290.

Thomas Paul Dumont, et al., "Laser Interaction With Materials: From Transparent Materials to Thin Films", Swiss Federal Institute of Technology Zurich for the degree of Doctor of Natural Sciences, Diss. ETH No. 16620, year of 2006, 162 Pages.

Rico Böhme, "Laser-Induced Backside Wet Etching of Glasses and Crystals", Nov. 6, 2007, 139 pages.

Lawrence Shah et al., "Femtosecond Laser Deep Hole Drilling of Silicate Glasses in Air", applied Surface Science, 2001, p. 151-164.

Rabia Qindeel et al., "IR Laser Plasma Interaction With Glass", American Journal of Applied Science 4 (12), 2007, pp. 1009-1015.

International Search Report of PCT/US2013/028022, 5 pages.
Written Opinion of PCT/US2013/028022, 2 pages.
International Search Report of PCT/US2013/0061212, 5 pages.
Written Opinion of PCT/US2013/0061212, 10 pages.
International Search Report of PCT/US2013/027947, 2 pages.
Written Opinion of PCT/US2013/0027947, 5 pages.

* cited by examiner

LASER MACHINING STRENGTHENED GLASS

TECHNICAL FIELD

This disclosure relates in general to laser processing, particularly to methods and apparatus for laser machining strengthened glass.

BACKGROUND

Contemporary consumer electronic devices including portable computing devices such as mobile phones and tablet computers, for example, can have glass screens that occupy a substantial portion of at least one surface of the device. Since these devices can be designed to be handheld, the glass screen can be exposed to a variety of environmental factors that can break or crack the glass screen. To reduce the risk of damage to the glass screen, device manufacturers can make the screens using glass that is strengthened or tempered chemically or thermally.

BRIEF SUMMARY

Laser machining a strengthened glass substrate with a laser processing system is described herein. One method includes directing a focal spot of a laser to a first position proximate to a first surface of a strengthened glass sheet, and removing material from the strengthened glass sheet along a closed path using the laser while the focal spot is in the first position, thereby forming a groove in the first surface of the strengthened glass sheet extending along the closed path. The method also includes, after forming the groove, directing the focal spot of the laser to a second position proximate to a second surface of the strengthened glass sheet, the second surface opposite from the first surface, and forming a kerf. The kerf is formed by removing a layer of material from the strengthened glass substrate at the second surface to form a newly-uncovered surface using the laser while the focal spot is in the second position, and removing at least one additional layer of material from the strengthened glass sheet starting at the newly-uncovered surface and finishing at the first surface using the laser by repositioning the focal spot a position proximate to each newly-uncovered surface resulting from removing a previous layer. The kerf intersects the first surface of the strengthened glass sheet in contact with the groove along the closed path.

An apparatus described herein includes memory and a processor. The processor is configured to instructions stored in the memory to direct a focal spot of a laser to a first position proximate to a first surface of a strengthened glass sheet, remove material from the strengthened glass sheet along a closed path using the laser while the focal spot is in the first position, thereby forming a groove in the first surface of the strengthened glass sheet extending along the closed path, after formation of the groove, direct the focal spot of the laser to a second position proximate to a second surface of the strengthened glass sheet, the second surface opposite from the first surface, and form a kerf. The instructions may form the kerf by removing a layer of material from the strengthened glass substrate at the second surface to form a newly-uncovered surface using the laser while the focal spot is in the second position, and removing at least one additional layer of material from the strengthened glass sheet starting at the newly-uncovered surface and finishing at the first surface using the laser by repositioning the focal spot a position proximate to each newly-uncovered surface resulting from removing a previous layer. The kerf intersects the first surface of the strengthened glass sheet in contact with the groove along the closed path.

Details of and variations in these embodiments and others are described in more detail below.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
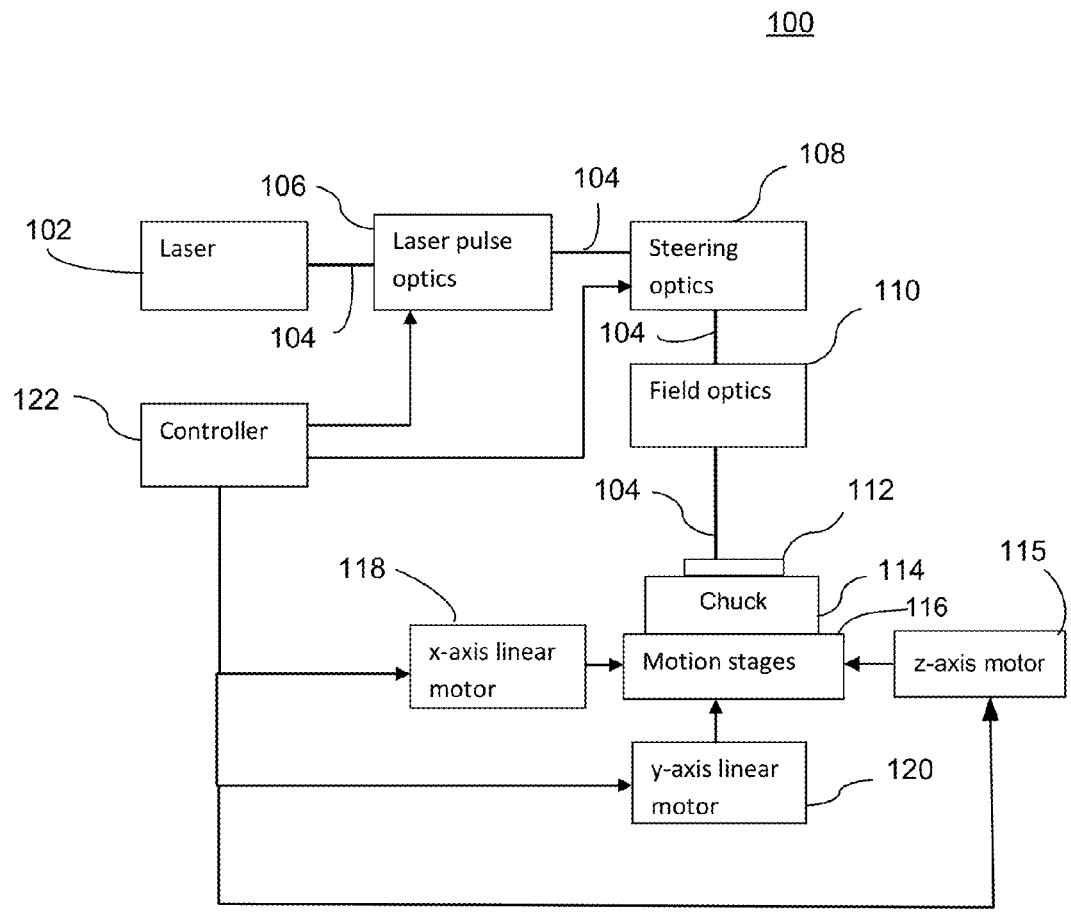
FIG. 1 is a diagram of a laser machining system according to an implementation of the teachings herein.

The use of strengthened glass (also referred to as tempered glass herein) has advantages for a variety of applications including portable computing devices such as mobile phones, tablet computers, media players and laptop computer displays, for example. Substrates of silicon-based glass can be strengthened by exposing the surfaces of a glass sheet to certain chemicals. For example, immersing certain types of glass in potassium salts can result in a process that replaces sodium with larger potassium atoms at the surface of the glass, resulting in deformations that put portions of the glass on and near the surface into compression and leave the interior of the glass sheet in tension.

The presence of compression and tension regions in strengthened glass can cause problems with traditional mechanical glass cutting techniques that use saws or blades. Laser machining can replace traditional saws and blades for making linear cuts in strengthened glass substrates, however, efficiently laser machining internal features in strengthened glass substrates can be difficult due to problems with small curved feature shapes, kerf sidewall taper and cracking of the substrate.

The compression of strengthened glass can exceed 600 MPa in regions at and near the surface of the glass. The interior regions of strengthened glass can be under tension exceeding 90 MPa. For example, 700 µm thick strengthened glass substrates can have an inner tension of about 40 MPA while 400 µm thick strengthened glass substrates can have an inner tension of about 91 MPa.

According to the teachings herein, one or more internal features formed in strengthened glass. An internal feature can be defined as a feature laser machined in a strengthened glass substrate where material is removed between a top surface of the substrate and a bottom surface of the substrate without reaching an edge of the substrate. The laser machined feature can include a blank in the interior of the feature that is separated from the substrate by the laser machining process and can be readily removed to provide an open feature in the substrate.

First, a shallow cut or trench may be laser machined in a first surface of the glass sheet or substrate. The trench in the first or top surface of the substrate can be formed by directing a beam of laser pulses at a first surface and moving the beam of laser pulses along a path on the surface. Undesired cracking of the substrate can be avoided by selecting appropriate laser parameters and by limiting the depth of the trench to the compression region near the surface of the substrate.

Following cutting the trench, the laser pulses can be focused through the substrate onto the opposite or second surface of the glass substrate. The laser parameters can be selected to produce pulses at wavelengths and pulse fluences to which the strengthened glass is transparent, thereby permitting the laser beam pulses to be directed through the first surface of the glass substrate, through the interior of the glass substrate to be focused onto or near the second or bottom surface of the glass substrate. Focusing the laser beam pulses in this fashion permits the glass substrate to be laser machined from the substrate surface opposite the direction from which the laser beam pulses impinge the substrate.

Removing material starting at the bottom surface of the substrate permits the material to be removed in "chips" as discussed in more detail below by selecting laser parameters appropriately. Since the substrate is being laser machined from the bottom up, the chips removed from the substrate to form the kerf can fall harmlessly out of the way as they are separated from the surface. By repeatedly directing the laser beam to a path that describes the kerf, material can be removed to form a through-cut from the bottom surface of the substrate to the top surface. By arranging the trench in the top surface to be outside and proximate to the through-cut kerf, any cracks formed in or near the surface in the compression region will be contained in the small region between the kerf and the trench FIG. 1 shows a laser processing system 100 that can be used to implement the techniques disclosed herein. Laser processing system 100 has a laser 102, which may be a solid state, fiber laser or other laser, and depends on the application. Laser 102 emits a laser beam 104 that is processed by laser pulse optics 106, which may be a simple optical component such as a lens or much more complex assemblies containing temporal and spatial beam shaping optics depending upon the laser parameters desired. Laser beam 10 is then directed by laser steering optics 108 through optional laser field optics 110 to substrate 112. Substrate 112 is supported on a chuck 114 attached to motion stages 116. In this example, motion stages 116 are controlled by an x-axis linear motor 118, a y-axis linear motor 120 and a z-axis motor 115. Laser processing system 100 can use z-axis motor 115 to move chuck 114 relative to laser field optics 110 to position the focal spot of laser beam 100 at different positions relative to substrate 112. In addition to or instead of z-axis motor 115, laser processing system 100 may include z-axis control as a part of steering optics 108 or laser field optics 110 to position the focal spot of laser beam 100 with respect to workpiece 112 through either moving the optics or adjusting the optics to re-focus laser 102.

Controller 122 controls laser 102, laser pulse optics 106, steering optics 108 and motion stages 116 through linear motors 118, 120 to direct laser beam 104 to workpiece or substrate 112. Controller 122 can be any controller, for example, a microcontroller that includes a central processing unit (CPU), random access memory (RAM), read only memory (ROM) and input/output ports receiving input signals and sending command signals to these components. The command signals are generally output based on programming instructions stored in memory, and the functions of each of the programming instructions are performed by the logic of the CPU. Various components could include their own controllers that transmit data to and from controller 122 as a main controller along a communication path. Moreover, controller 122 could be incorporated into a computer, such as a personal computer. Controller 122 could also be implemented by one or more microprocessors using external memory.

Any number of known designs can be used for motion stages 116. In this example, y-axis linear motor 120 moves chuck 114 along rails (not shown) oriented along the y-axis to make a scribe line as discussed in more detail hereinafter. To make a scribe line along the x-axis, x-axis linear motor 118 would move chuck 114 and the motion stage including the rails along a second set of rails (not shown) oriented along the x-axis. Instead of the arrangement described, laser field optics 110 and optionally laser 102, laser pulse optics 106 and/or steering optics 108 could be mounted in a head movable along one of the x-axis and the y-axis (and optionally the z-axis), while a single motion stage 116 is configured to move in the other of the x-axis and the y-axis using, for example, a linear motor moving chuck 114 along rails. Another option is to mount a head supporting laser field optics 110 and optionally laser 102, laser pulse optics 106 and/or laser beam steering optics 108 so that the head is movable along each of the x-axis and the y-axis (and optionally the z-axis), while chuck 114 is mounted on a fixed base. Rotational movement can also be included in laser processing system 100.

Laser beam steering optics 108 generally includes galvanometers, fast steering mirrors, piezo-electric devices, electro-optical modulators, acousto-optical modulators and the like. Beam positioning equipment such as beam steering optics 108 can provide relatively fast positioning. For example, one embodiment of beam steering optics 108 can include two galvanometer-based scanners, commonly called "galvos," arranged one each on the x- and y-axes. Each galvo includes three main components—the galvanometer, a mirror (or mirrors) and a servo driver board that controls the system. The galvos may be arranged along a respective axis and rotate their respective mirror(s) at a high speed from side to side, instead of spinning continuously in one direction, thus providing a side-to-side laser path, for example.

Figure 2:
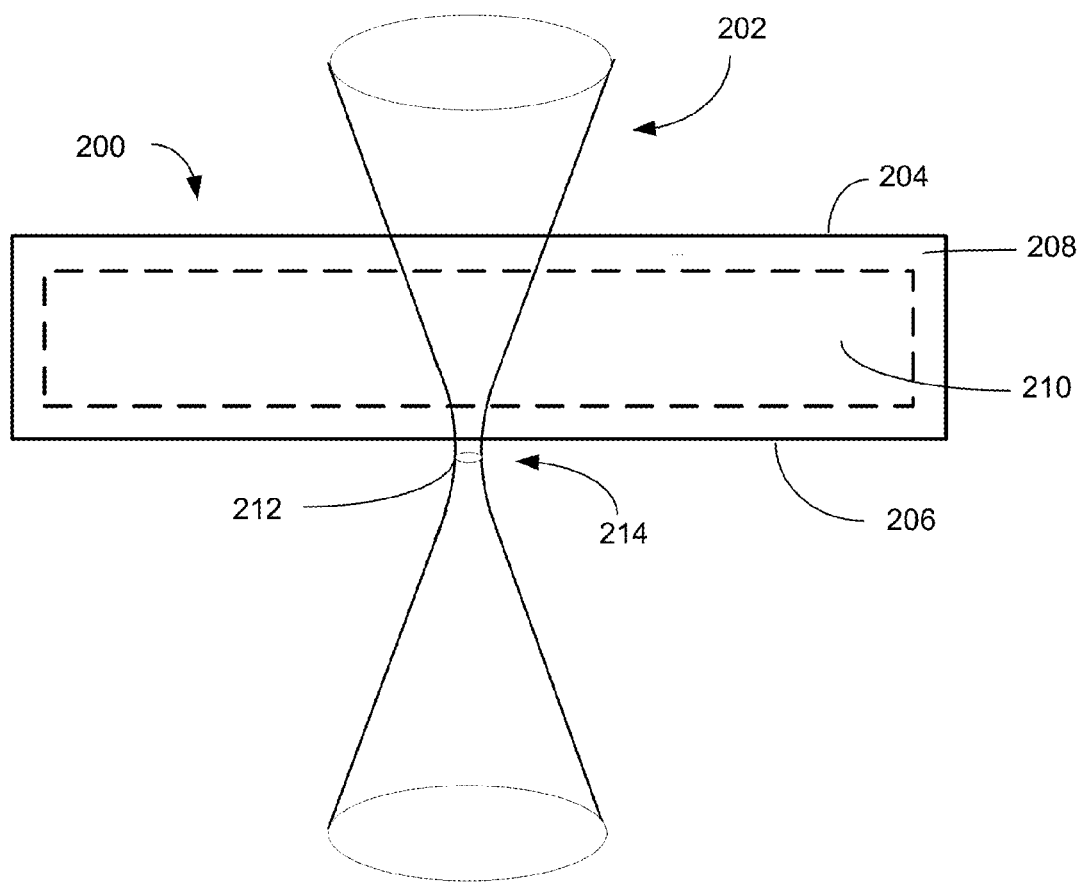
FIG. 2 is a diagram of laser machining a glass substrate used to explain terms used herein.

A laser beam is the volume that laser pulses describe as they are emitted from the laser and travel through the laser optics or free space to a target or workpiece. The laser beam can be defined as the envelope within which the laser pulses maintain at least certain energy as they pass. Referring to FIG. 2, a pulsed laser beam 202 is applied to a strengthened glass sheet or substrate 200. The portion of laser beam 202 that is focused down to the smallest cross-sectional area can be called the focal spot 212. As laser beam 202 approaches and leaves focal spot 212, it can form a beam waist 214 proximate to focal spot 212 as the path of laser beam 202 narrows and widens. As laser beam 202 passes through beam waist 214 and focal spot 212, the fluence, or energy per unit area (e.g., measured in Joules/cm$^2$), increases due to the decreasing cross-sectional area laser beam 202 travels through. The fluence reaches a maximum as laser beam 202 passes through focal spot 212 and then decreases as laser beam 202 leaves focal spot 212 via beam waist 214.

A kerf may be laser machined from the top to bottom surface. However, debris formed by such machining can collect in the kerf as it is being formed. Debris in a kerf can absorb and re-transmit thermal energy to, thereby slowing machining rates and potentially causing heat associated flaws such as cracking due to thermal transmission from the debris. Instead, and using in part the arrangement of FIG. 2, laser machining may be performed from the bottom up. Laser beam 202 is directed by a laser processing system, such as laser processing system 100, through the top or first surface 204 of strengthened glass substrate 200, through a compression region 208 and a tension region 210, through compression region 208 again and then exits strengthened glass substrate 200 through the bottom or second surface 206. Focal spot 212 of beam waist 214 can be positioned using z-axis motor 115 or by re-focusing laser beam 202, for example, at or near bottom or second surface 206 of strengthened glass substrate 200. As discussed above, transparency of a material to laser pulses can be a function of wavelength and fluence. By directing a beam of laser pulses at a selected wavelength and fluence through first or top surface 204 of strengthened glass substrate 200 and positioning focal spot 212 of a beam of laser pulses below and proximate to bottom or second surface 206 of substrate 200, chips can be formed in the bottom surface of the strengthened glass substrate to remove material without adding debris to the kerf.

By moving laser beam focal spot 212 with respect to second surface 206 of strengthened glass substrate 200 so as to maintain the z-height of the laser beam focal spot at or near the newly-formed surface, laser pulses can be positioned so that the chips caused by each pulse of the laser beam are combine to form a kerf wider and longer than a single chip. By repeatedly repositioning the laser beam pulses at the newly formed surface using motion control or refocusing, a kerf of the desired dimensions and shape can be produced so as to machine the kerf completely through the strengthened glass substrate from the bottom surface to the top.

As mentioned briefly above, laser machining strengthened glass substrates can cause rapid and uncontrolled cracking in the inner tension region as cracks created by the laser machining process propagate from a compression region to the inner tension region. Without being bound to any particular theory, aspects of disclosed implementations avoid rapid and uncontrolled cracking as a result of adjusting the laser parameters to remove material from the strengthened glass substrate by "chipping" material from a surface of the substrate. In this process, a thin, laser spot-sized chip of material having a diameter approximately equal to the focal spot size and about one or two microns thick is removed from the surface of the strengthened glass substrate by a single picosecond laser pulse. As each chip is removed from the substrate, a substantial portion of the residual thermal energy remaining in the substrate after the pulse fractures the chip from the surface is carried away with the chip, thereby preventing heat transfer to adjacent regions.

In addition to thermal effects, fracture mechanics can indicate that there is a critical crack length above which uncontrolled cracking will take place. This critical crack length $a(\sigma_f)$ can be calculated using the formula:

$$a(\sigma_f) = (2\gamma E)/(\pi \sigma_f^2); \text{ wherein} \quad (1)$$

Figure 3:
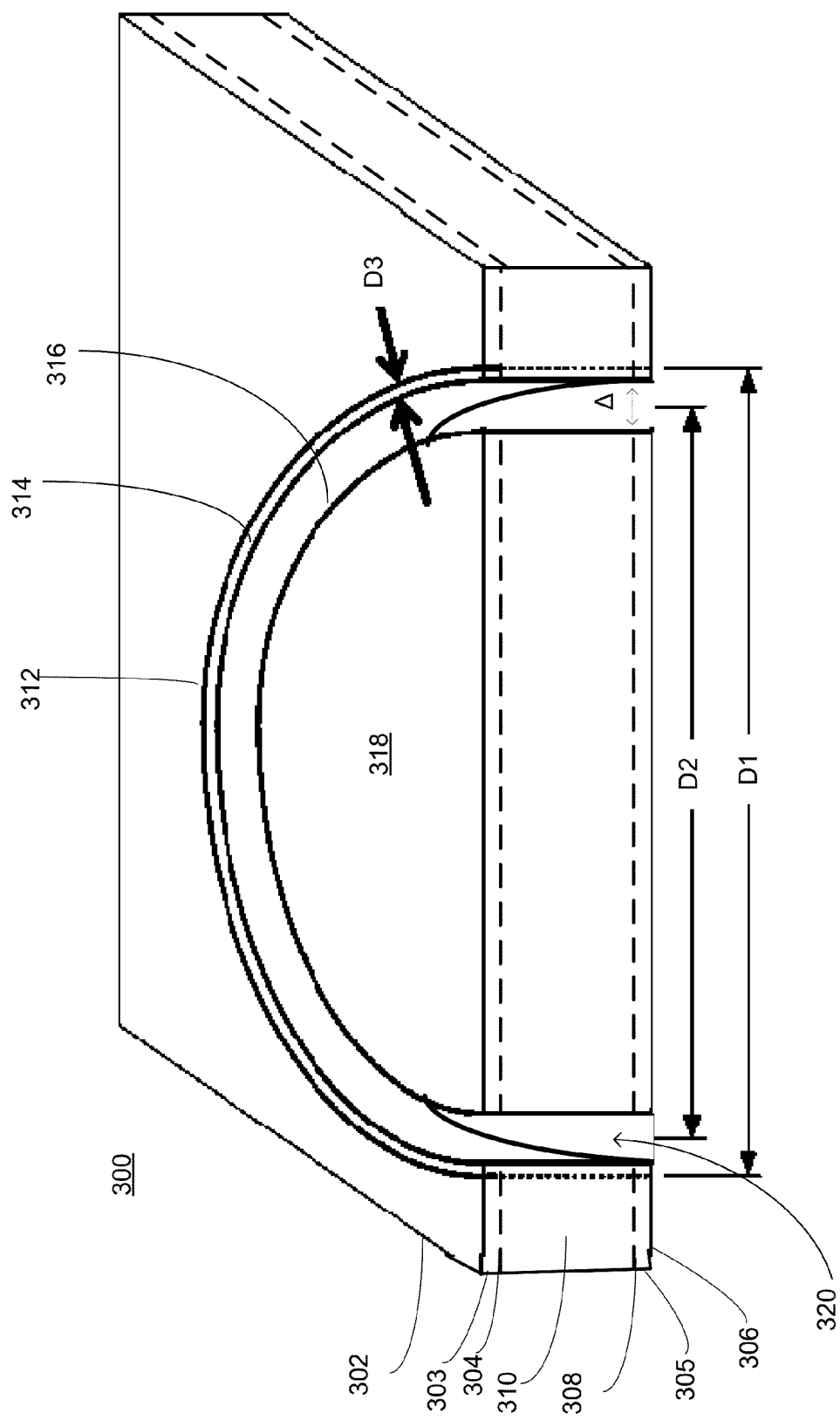
FIG. 3 is a diagram of laser machining a glass substrate according to an implementation of the teachings herein.

$\sigma_f$ is the applied stress;
$\gamma$ is the surface energy density for glass; and
E is Young's modulus. For glass with an inner tension of about 91 MPa, this formula yields a critical crack length of 5 µm. Without being bound to any particular theory, it is theorized that cracks are inhibited from being created when a focal spot size is used that is larger than the critical crack length. Inhibiting crack creation can prevent rapid, uncontrolled cracking in the region of the substrate under tension. FIG. 3 is a cross-sectional view of a strengthened glass substrate 300 showing laser machining according to aspects of disclosed implementations. FIG. 3 shows a strengthened glass substrate 300 having compression regions 303, 305 adjacent each of a top surface 302 and a bottom surface 306. Dotted lines 304, 308 respectively indicate depths of compression regions 303, 305 below surfaces 302, 306. Between dotted lines 304, 308 there can be an interior region 310 that is under tension.

The first step in the process of laser machining interior features in a strengthened glass plate 300 can include laser machining a trench 312 in compression region 303 of top surface 302. Trench 312 may be machined by focusing the beam waist of the laser pulses at or near top surface 302 and moving the laser pulses along a path on top surface 302 of substrate 300 at a selected scan velocity, using steering optics 108, motion stages 116 or a combination of steering optics 108 and motion stages 116 in response to commands from controller 122, for example. The laser beam pulse parameters can be adjusted to form trench 312 so that trench 312 is about as wide as the focal spot and extends several microns into top surface 302 with a mean path radius of D1. The laser beam parameters can be adjusted to permit trench 312 to be laser machined without penetrating beyond compression region 303 into interior tension region 310. Confining trench 312 to compression region 303 prevents uncontrolled crack propagation in interior tension region 310 that could lead to eventual part failure.

Laser parameters that can be selected to produce the desired level of material removal while avoiding cracking include laser wavelength, laser power, pulse duration, pulse energy, focal spot size, pulse repetition rate, polarization and scan velocity. Examples of laser parameters that can be used to laser machine strengthened glass substrates include a wavelength between 266 nm and 1064 nm, laser power of between 1 watt and 50 watts, a pulse duration between 1 femtosecond and 100 nanoseconds, a pulse energy between 1 µJ and 100 µA at the work surface, a spot size between 1 µm and 100 µm, a pulse repetition rate between 100 kHz and 10 MHz, circular polarization and a scan velocity between 1,000 mm/s and 100,000 mm/s. In certain implementations, the laser parameters include a wavelength of about 515 nm, laser power between about 6.2 watts and 14.5 watts, a pulse duration of about 27 ps, a pulse energy at the work surface of about 14.5 µJ, a spot size of about 12 µm, a pulse repetition rate between 100 kHz and 10 MHz, and a scan velocity between about 2,000 mm/s and 10,000 mm/s.

Laser pulse parameters are desirably selected to couple enough energy per pulse to cause a microscopic "chip" of material as described previously to separate from the surface without causing cracks in the adjacent material. As mentioned, chips produced by the laser pulses can be about the same area as the focal spot size of the laser pulses with a thickness of one or two microns. In this example, the focal spot size (i.e., diameter) can be about 8-12 µm. By positioning the laser pulses with respect to a surface of substrate 300, material can be removed over a desired area to a desired depth by repeated laser pulses. This material removal process can be influenced by the polarization state of the laser beam. An implementation of the teachings herein can circularly polarize the laser beam to improve the uniformity of material removal, for example. Other types of polarization including linear or elliptical polarization can also be used.

Returning to FIG. 3, following forming trench 312 in top surface 302 of strengthened glass substrate 300, the laser processing system positions the focal spot of the laser pulses at or beneath bottom surface 306 of strengthened glass substrate 300 to form a kerf 320 by removing material starting at the bottom surface 306 and ending at the top surface 302. For example, kerf 320 can be formed by directing one laser pulse or a group of individual laser pulses in the direction along width Δ as described below to remove one or two microns of material as chips starting at bottom surface 306 along the entire closed path and then repeating the process while raising the z-height of the focal spot to position the focal spot with respect to the surface being machined. The focal spot may be moved using a z-motion stage to move substrate 300 relative to the laser (e.g., using z-axis motor 115) or the laser relative to substrate 300 so that the focal spot moves relative to the processing surface of substrate 300. Alternatively, control of the laser may be changed to adjust the focal spot position without changing the diameter or requiring mechanical z-axis movement. When a group of individual laser pulses are used, they may be formed by a plurality of lasers arranged so that their beams are applied in a straight or curved line or in some regular pattern such as a hexagonal packed arrangement.

The laser pulse parameters used may be similar to those described above. Appropriate selection of laser parameters can permit the unfocused laser pulses to pass through strengthened glass substrate 300 without damage yet have enough energy to ablate strengthened glass substrate 300 at locations where the focal spot intersects or is proximate to substrate 300. Each new position of the focal spot corresponds or nearly corresponds to the current surface being machined as kerf 320 extends from the initial machining surface, bottom surface 306.

Laser machining kerf 320 proceeds by removing material from the bottom to the top of the substrate 300 while following a closed path around the internal feature being machined. Assuming that a radius D2 has been selected for a particular internal feature, which would be round in the example of FIG. 3, a width Δ for the through-cut can be selected that provides clean removal of the resulting internal blank 318 so that only the internal feature is left. Once width Δ is selected, the number of kerf passes or paths of laser pulses required to remove this material can be calculated by dividing width Δ of the through-cut by the laser spot size minus the overlap between passes, referred to as the kerf step. The kerf step times the number of passes about the closed path yields width Δ according to:

$$\Delta = \text{Kerf Step} \times \text{Kerf Passes} \quad (2)$$

Radius D2 of the desired internal feature can be calculated from the radius D1 of the through-cut by the equation:

$$D1 = D2 + \Delta + N \times \text{Kerf Step} \quad (3)$$

where N is an integer that can assume a value between 1 and 3, for example. Assuming a 10 μm focal spot size and a value of N=2, this equation yields a distance D3 between the outer edge 314 of the through-cut and an outer edge of trench 312 of about 13 to 15 μm. Removing the material between outer edge 314 and an inner edge 316 permits the cut-out piece or blank 318, to be completely free of the substrate and subsequently discarded.

As the beam waist of the pulsed laser beam approaches top surface 302 of strengthened glass substrate 300 from bottom surface 306, the laser pulses that create chips to extend the kerf can cause some degree of cracking as top surface 302 is exposed to energy from below. Cracks formed by the laser pulses in or near top surface 302 can be contained in the region between the outer edge 314 of the through-cut and trench 312, thereby preventing uncontrolled propagation of cracks in top surface 302. Cracks occurring in blank 318 can be discarded along with blank 318.

In an alternative implementation, the two-step process may be used to generate the internal feature as the resulting product. That is, instead of discarding the central cut out portion as a blank, the outer portion may be considered to be the undesirable portion so that a smooth outer edge is generated for the resulting product formed of the internal feature. This would involve forming groove or trench 312 to the inside of the feature as opposed to the outside as shown in FIG. 3.

Figure 4:
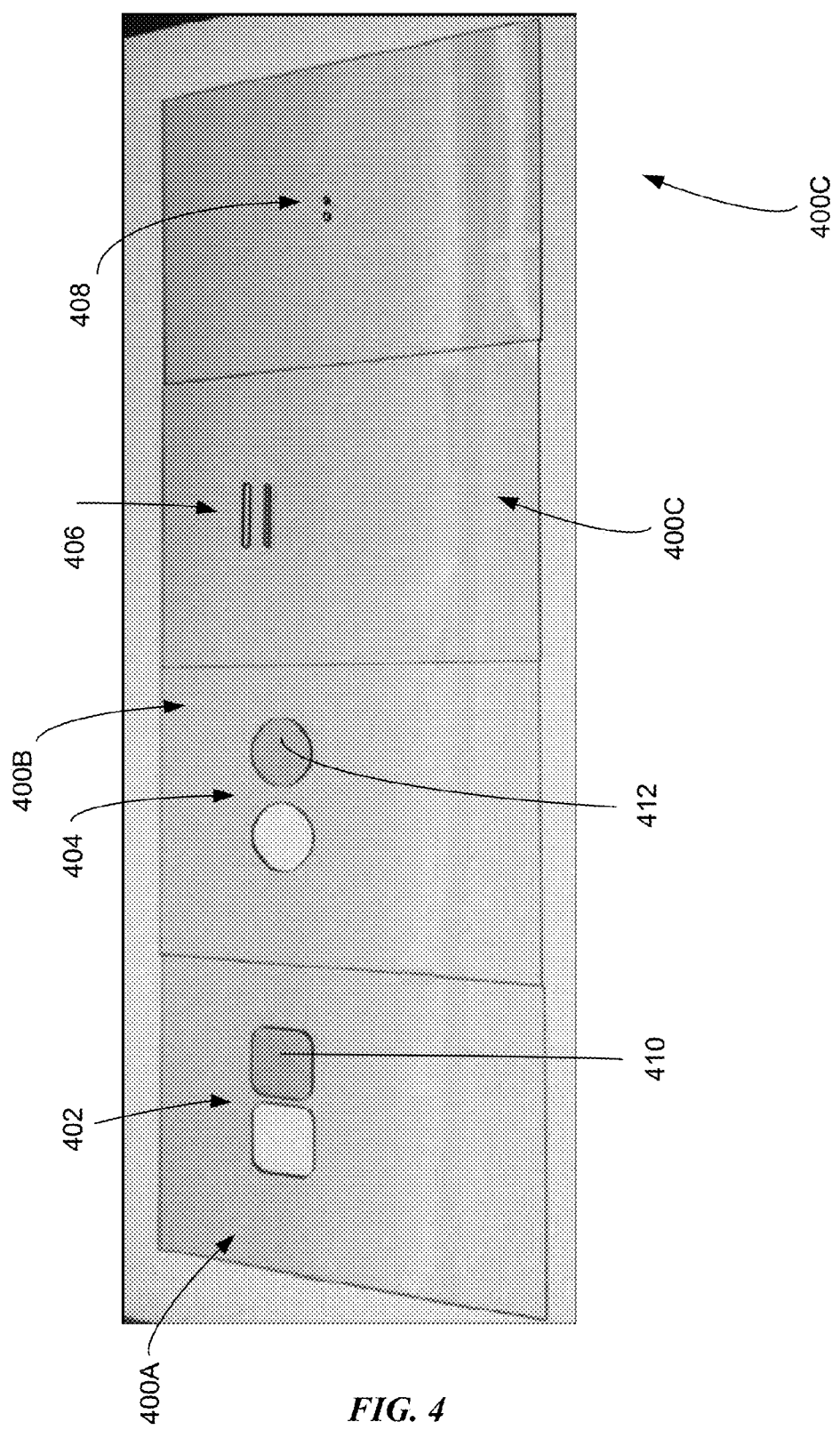
FIG. 4 is a photograph of examples of glass laser machining internal features according to an implementation of the teachings herein.

FIG. 4 shows examples of internal features machined in strengthened glass substrates 400A-400D. FIG. 4 shows 10 mm squares 402 with rounded corners (with a 2 mm radius) machined in substrate 400A, 10 mm circles 404 machined in substrate 400B, 10 mm×1 mm slots 406 with 0.5 mm radius at the corners machined in substrate 400C, and 1 mm circles 408 machined in substrate 400D. A property of internal features is that in cases where an internal blank is created as a result of the machining, the internal blank can be discarded. Therefore, any cracks that occur in the internal blank can be disregarded. In FIG. 4, an internal blank 410 for one of 10 mm squares 402 and an internal blank 412 for one of 10 mm circles 404 are shown. The remaining internal features of FIG. 4 are finished, in that the internal blanks formed by the machining described above have been removed. By example, substrates 400A-400D are each 0.7 mm thick and made of strengthened glass having a first Central Tension (C.T.) value. For 120 cut features, yield was 100%. The cutting speed was about 1.7 mm/s for squares 402, circles 404 and slots 406, but circles 408 required a slower speed due to the limitations of the scan head used. In another example, substrates 400A-400D are each 0.4 mm thick and made of strengthened glass having a second C.T. value higher than the first C.T. value. For 120 cut features, yield was 100%. The cutting speed was about 2.38 mm/s for squares 402, circles 404 and slots 406, but again circles 408 required a slower speed due to the limitations of the scan head used.

Figure 5A:
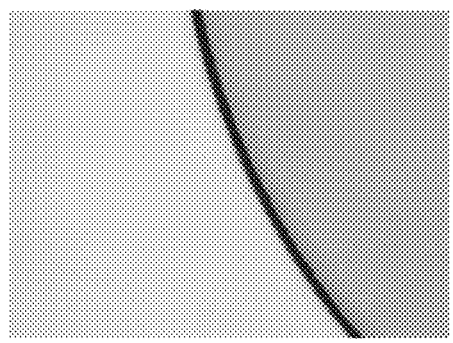
FIGS. 5A-5D are close-up photographs of details of glass including laser machined features according to an implementation of the teachings herein.
Figure 5C:
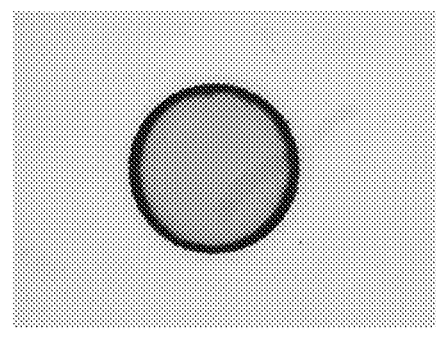
Figure 5B:
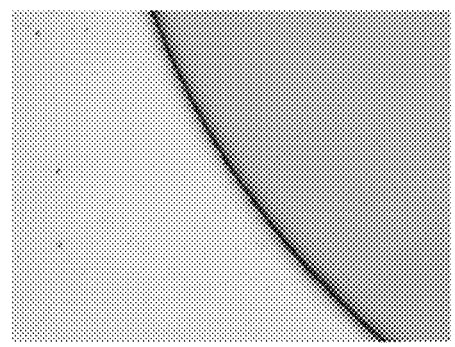
Figure 5D:
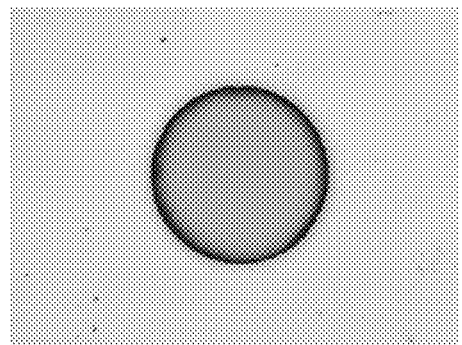

FIGS. 5A-5D are photographs of a 1 mm round hole laser machined in a strengthened glass substrate according to aspects of disclosed implementations. FIG. 5A is a photograph of a top surface showing an edge of the hole. FIG. 5B shows the same edge taken from the associated bottom surface. FIG. 5C is a photograph of the entire 1 mm hole taken from the top surface at a lower resolution than those in FIGS. 5A and 5B. FIG. 5D is a photograph of the same hole as that in FIG. 7C taken from the bottom surface. Note that all of the edges appear intact, smooth and uncracked. The dark areas near edges are shadows.

According to the description herein, a first step of laser scribing forms one or more shallow grooves in a top surface of a sheet of strengthened glass along a closed path forming a shape of a desired cut out (also called an internal feature). Then, the laser is focused onto the bottom of the strengthened glass so that the glass is cut from the bottom to the top by refocusing the laser with the cut line using direct ablation. Cracks and chipping are confined by the grooves so that very good edge quality without chipping may be achieved. The cutting can occur at relatively high speeds and can be used with features as small as several hundred microns. Glass sheets ranging in thickness from 1 mm to 10 mm were tested and resulted in a 100% yield (that is, no loss of product due to cracking or chipping).

The above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method, comprising:
    directing a focal spot of a laser to a first position proximate to a first surface of a strengthened glass sheet;
    removing material from the strengthened glass sheet along a closed path using the laser while the focal spot is in the first position, thereby forming a groove in the first surface of the strengthened glass sheet extending along the closed path;
    after forming the groove, directing the focal spot of the laser to a second position proximate to a second surface of the strengthened glass sheet, the second surface opposite from the first surface; and
    forming a kerf by:
        removing a layer of material from the strengthened glass substrate at the second surface to form a newly-uncovered surface using the laser while the focal spot is in the second position; and
        removing at least one additional layer of material from the strengthened glass sheet starting at the newly-uncovered surface and finishing at the first surface using the laser by repositioning the focal spot a position proximate to each newly-uncovered surface resulting from removing a previous layer;
    wherein the kerf intersects the first surface of the strengthened glass sheet in contact with the groove along the closed path.

2. The method of claim 1 wherein the first surface and the second surface and portions of the strengthened glass sheet adjacent to the first surface and the second surface are under compression and an interior portion of the strengthened glass sheet extending between the portions of the strengthened glass sheet proximate to the first surface and the second surface is under tension.

3. The method of claim 2 wherein the groove is confined to a portion of the strengthened glass substrate adjacent to the first surface that is under compression.

4. The method of claim 1, further comprising:
    setting laser parameters of the laser used while forming the kerf such that laser pulses from the laser are transmitted through the strengthened glass sheet.

5. The method of claim 1, further comprising:
    setting laser parameters of the laser such that a laser pulse removes a chip of material from the strengthened glass sheet having a diameter that is approximately equal to a size of the focal spot.

6. The method of claim 5 wherein the laser parameters include laser wavelength, laser power, pulse duration, pulse energy, pulse repetition rate, polarization and scan velocity.

7. The method of claim 1 wherein the first surface is a top surface of the strengthened glass sheet closest to the laser.

8. The method of claim 1, further comprising:
    removing an area of the strengthened glass sheet encompassed by the closed path from a remaining area of the strengthened glass sheet.

9. The method of claim 1 wherein an external edge of the kerf intersects the first surface of the strengthened glass substrate in contact with an external edge of the groove along the closed path, the external edge of the kerf and the external edge of the groove defined relative to a shape formed by the closed path.

10. The method of claim 1 wherein an internal edge of the kerf intersects the first surface of the strengthened glass substrate in contact with an internal edge of the groove along the closed path, the internal edge of the kerf and the internal edge of the groove defined relative to a shape formed by the closed path.

11. The method of claim 1 wherein the closed path forms one of a square having rounded edges, a circle or a notch having rounded edges.

12. An apparatus, comprising:
    memory; and
    a processor configured to execute instructions stored in the memory to:
        direct a focal spot of a laser to a first position proximate to a first surface of a strengthened glass sheet;
        remove material from the strengthened glass sheet along a closed path using the laser while the focal spot is in the first position, thereby forming a groove in the first surface of the strengthened glass sheet extending along the closed path;
        after formation of the groove, direct the focal spot of the laser to a second position proximate to a second surface of the strengthened glass sheet, the second surface opposite from the first surface; and
        form a kerf by:
            removing a layer of material from the strengthened glass substrate at the second surface to form a newly-uncovered surface using the laser while the focal spot is in the second position; and
            removing at least one additional layer of material from the strengthened glass sheet starting at the newly-uncovered surface and finishing at the first surface using the laser by repositioning the focal spot a position proximate to each newly-uncovered surface resulting from removing a previous layer;
        wherein the kerf intersects the first surface of the strengthened glass sheet in contact with the groove along the closed path.

13. The apparatus of claim 12 wherein a depth of the groove is limited to a depth of an outer surface of the strengthened glass sheet adjacent to the first surface that is under compression so that the groove does not contact an interior portion of the strengthened glass sheet that this under tension.

14. The apparatus of claim 12 wherein the processor is configured to:
    set laser parameters of the laser used while forming the kerf such that laser pulses from the laser are transmitted through the strengthened glass sheet.

15. The apparatus of claim 12 wherein the processor is configured to:
    set laser parameters of the laser such that a laser pulse removes a chip of material from the strengthened glass sheet, the chip having a diameter that is approximately equal to a size of the focal spot.

16. The apparatus of claim 15 wherein a wavelength of the laser is about 515 nm.

17. The apparatus of claim 12 wherein the closed path forms one of a square having rounded edges, a circle or a notch having rounded edges.

18. The apparatus of claim 12, further comprising:
    the laser;
    laser steering optics;
    laser field optics; and
    at least one motion stage; wherein the laser, the laser steering optics and the at least one motion stage are controlled by the processor to direct laser pulses from the laser through the laser field optics to:

direct the focal spot of the laser to the first position;
remove the material from the strengthened glass sheet along the closed path using the laser while the focal spot is in the first position;
direct the focal spot of the laser to the second position; and
form the kerf.

* * * * *